United States Patent [19]

Lüscher et al.

[11] Patent Number: 5,164,893
[45] Date of Patent: Nov. 17, 1992

[54] LOW INDUCTANCE GTO SWITCHING CIRCUIT FOR AN INVERTER

[75] Inventors: Hansueli Lüscher, Lupfig; Herbert Stemmler, Kirchdorf, both of Switzerland

[73] Assignee: Asea Brown Boveri Ltd., Baden, Switzerland

[21] Appl. No.: 734,786

[22] Filed: Jul. 23, 1991

[30] Foreign Application Priority Data

Jul. 26, 1990 [DE] Fed. Rep. of Germany ....... 4023687

[51] Int. Cl.$^5$ ..................... H02M 7/521; H02H 7/122
[52] U.S. Cl. ................................... 363/137; 363/141; 363/68; 363/58
[58] Field of Search .................. 363/34, 35, 68, 141, 363/144, 57, 58, 56, 137

[56] References Cited

U.S. PATENT DOCUMENTS

| | | | |
|---|---|---|---|
| 4,578,745 | 3/1986 | Olsson | 363/68 |
| 4,633,063 | 12/1986 | Willis | 219/243 |
| 4,654,627 | 3/1987 | Harkness | 338/319 |
| 4,686,618 | 8/1987 | McMurray | 363/58 |
| 4,737,745 | 4/1988 | Doepker | 333/183 |
| 4,739,447 | 4/1988 | Lecomte | 361/386 |
| 4,809,153 | 2/1989 | Bremer et al. | 363/141 |
| 4,888,676 | 12/1989 | Zurcher | 363/58 |
| 5,031,069 | 6/1991 | Anderson | 361/321 |

FOREIGN PATENT DOCUMENTS

| | | |
|---|---|---|
| 0069971 | 11/1985 | European Pat. Off. . |
| 0166968 | 7/1988 | European Pat. Off. . |
| 3717488 | 12/1988 | Fed. Rep. of Germany . |
| 3743436 | 5/1989 | Fed. Rep. of Germany . |
| 3802593 | 8/1989 | Fed. Rep. of Germany . |

OTHER PUBLICATIONS

Siemens-Schuckertwerke AG, Gleichrichteranordnung Apr. 23, 1965, pp. 1-7.
"Gate Circuit for GTO Thyristor", Pat. Abstracts of Japan, Dec. 15, 1987, vol. 11, No. 384.
"Snubber Circuit for GTO", Pat. Abstracts of Japan, Jul. 2, 1987, vol. 11, No. 204.
"GTO-Pulswechselrichter fur Schienenfahrzeuge mit Batterieeinspeisung", Holweck & Richter, Elektrische Bahnen eb 86, Jahrgang, Heft Mar. 1988, pp. 94-100.
"GTO Inverter for AC Traction Drives", Ueda, et al., IEEE Transactions on Industry Applications, vol. IA-19, No. 3, May/Jun. 1983, pp. 343-348.

Primary Examiner—Steven L. Stephan
Assistant Examiner—Ben Davidson
Attorney, Agent, or Firm—Burns, Doane, Swecker & Mathis

[57] ABSTRACT

With respect to their connection to snubber capacitors (C1, C2), a discharge resistor (12) connecting these snubber capacitors, and a link capacitor bank (3), inverter circuits with GTO thyristors (T1, T2) connected in series have parasitic leakage inductances which limit the level of the permissible link direct voltage. In order to reduce the leakage inductances, the snubber capacitors (C1, C2) are surrounded by effectively conducting capacitor covers (17). Sheet-metal shielding covers are fitted over the two ends of the discharge resistor (12). Parallel and series connected capacitors of the link capacitor bank (3) are connected to the positive/negative terminals (23, 24) of the GTO thyristors (T1, T2) in the middle of a heat sink connecting strainer (33), the supply leads being guided essentially parallel and the capacitors being arranged in opposite planes.

13 Claims, 2 Drawing Sheets

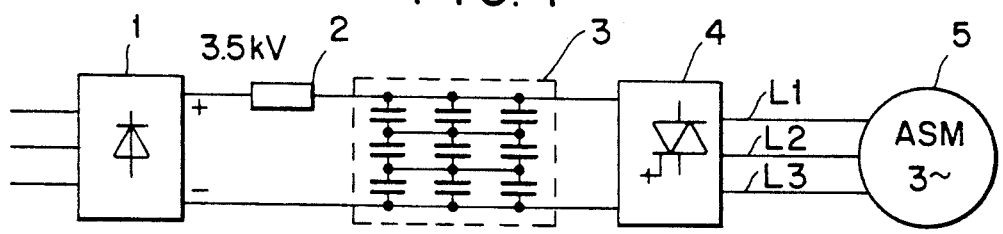
FIG. 1
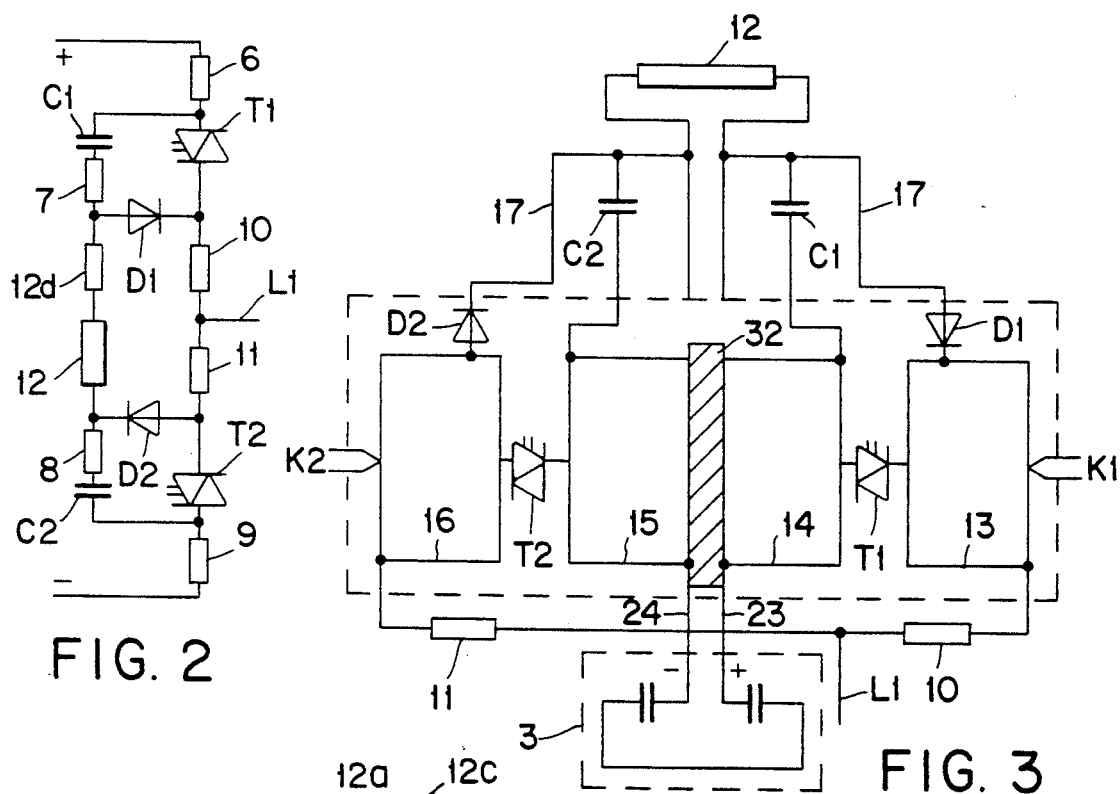
FIG. 2
FIG. 3
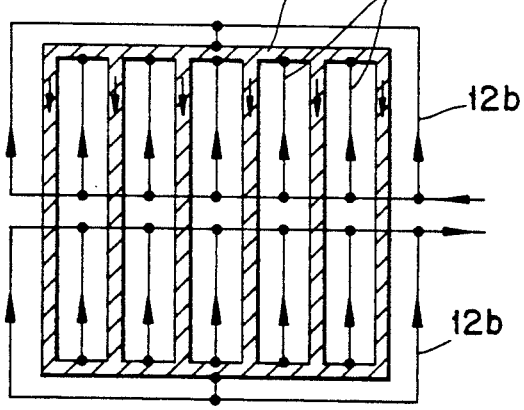
FIG. 4
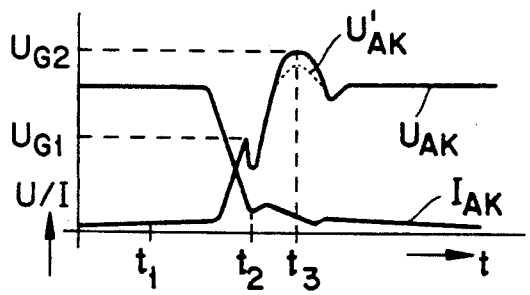
FIG. 8

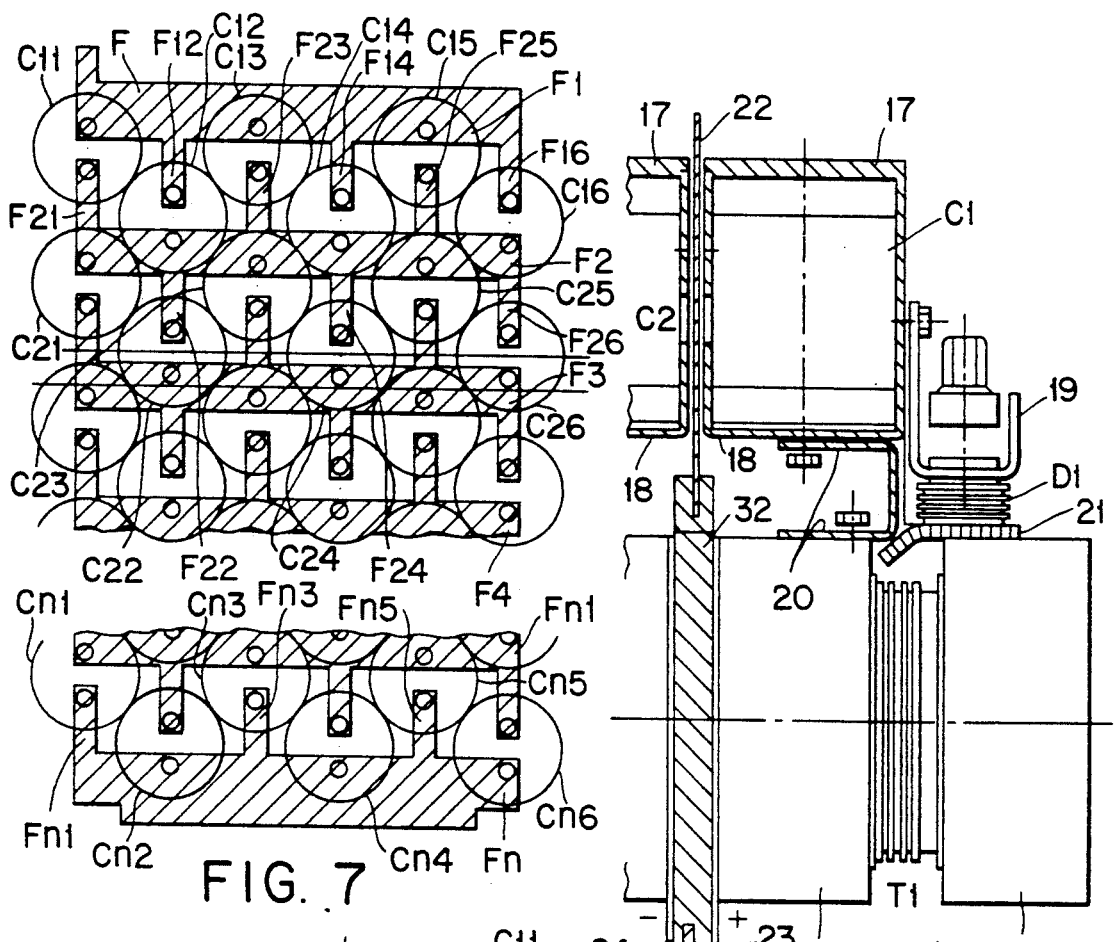
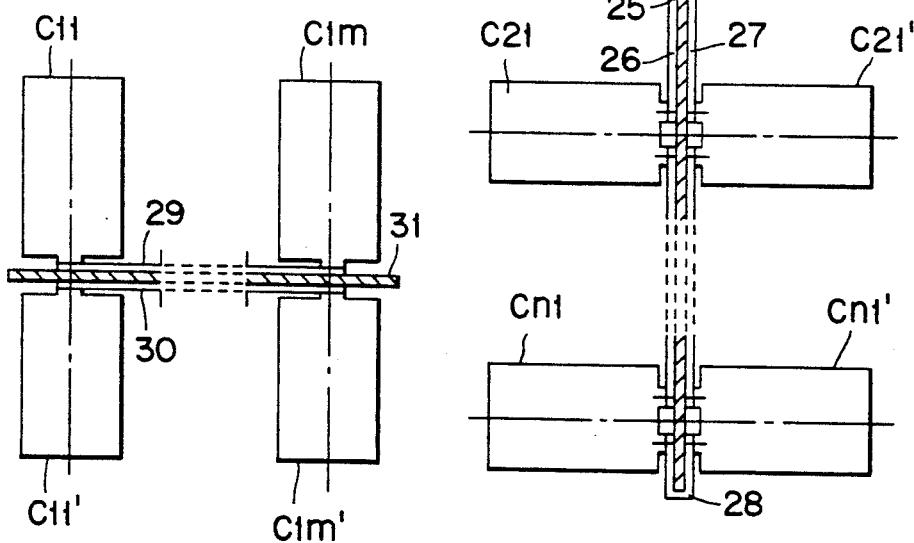
FIG. 7
FIG. 6
FIG. 5

LOW INDUCTANCE GTO SWITCHING CIRCUIT FOR AN INVERTER

BACKGROUND OF THE INVENTION

1. Field of the Invention

The present invention relates to a converter arrangement which includes a directed voltage circuit and at least one inverter circuit.

2. Discussion of Background

Prior art is known from the publication by W. Mc-Murray, Circuit d'aide à la commutation des GTO (circuit using GTO switching), in the French journal: électronique de PUISSANCE 11, September 1985, pages 12 and 13. In that publication, an inverter circuit with 2 GTO thyristors is specified which are connected in series via a reactor. The load is connected to the center tap of the reactor. The snubber capacitors and snubber diodes of the two GTO thyristors are connected to one another via a discharge resistor. In order to minimize parasitic inductances, a capacitor is provided on the direct voltage side of the inverter.

SUMMARY OF THE INVENTION

The invention achieves the object of increasing the direct voltage permissible at the inverter without increasing the number of the inverter valves.

An advantage of the invention consists in that the power of the inverter can be increased along with the increase in the inverter direct voltage. This results in lower costs per power unit.

The increase in the permissible direct voltage is achieved by design measures for reducing the parasitic inductances. These measures are based on the common idea of keeping electrical loops as small as possible.

In accordance with an advantageous embodiment of the invention, when GTO thyristors with a turn-off current of 2 kA are used a combination of the measures according to the invention permits an increase in the applied direct voltage of normally 3.2 kV to 3.5 kV. This is achieved by a reduction in parasitic inductances of normally 0.6 $\mu$H to 0.15 $\mu$H.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows an application-oriented converter circuit with a dc link and an inverter in a 3-phase design, FIG. 2 shows a detailed circuit of the inverter in accordance with FIG. 1 for one phase of a load-side alternating current, FIG. 3 shows a block diagram of the arrangement of the components in the inverter circuit in accordance with FIG. 2, with closed link capacitor bank, FIG. 4 shows a discharge resistor of the inverter circuits in accordance with FIGS. 2 and 3, FIG. 5 hows a representation of sections of the arrangement of components of the inverter circuit in accordance with FIG. 3, FIG. 6 shows a block diagram of parallel-connected capacitors of the link capacitor bank in accordance with FIGS. 1 and 3, FIG. 7 shows a circuit arrangement of capacitors, connected in parallel and in series, of the capacitor bank in accordance with FIGS. 1 and 3, and FIG. 8 shows a block diagram of the time dependence of anode-cathode voltage and anode-cathode current of a GTO thyristor of the inverter in accordance with FIGS. 1-3.

DESCRIPTION OF THE PREFERRED EMBODIMENTS

Referring now to the drawings, wherein like reference numerals designate identical or corresponding parts throughout the several views, FIG. 1 shows as an example of the application of the converter arrangement according to the invention a 3-phase asynchronous machine (5) which is fed per ac phase by a converter (1-4) via a load current conductor (L1-L3) in each case. The converter (1-4) consists of a rectifier (1), an inverter (4) and a dc link with a link reactor (2) and a link capacitor bank (3).

FIG. 2 shows the circuit of the inverter (4) for one ac phase. The circuit for the two other ac phases is identically constructed. (T1) and (T2) designate turn-off valves or GTO thyristors with anti-parallel diodes, which are connected in series via two reactance coils (10, 11) to an inductance of 5 $\mu$H in each case. The GTO thyristors (T1, T2), are designed for a turn-off current of 2 kA and a direct voltage of 4.5 kV. A load current conductor (L1) is connected to the electrical tie point of the 2 reactance coils. Instead of 2 reactance coils (10, 11), it is also possible to use one reactance coil with center tap (not represented). These reactance coils (10, 11) can also be eliminated in a series circuit of 2 inverters via a shared load.

A snubber capacitor (C1) or (C2) is connected in series with a snubber diode (D1) or (D2) in a parallel branch to each GTO thyristor (T1, T2). The capacitance of the snubber capacitors (C1, C2) is 2.5 $\mu$F in each case. The two snubber capacitors (C1, C2) and snubber diodes (D1, D2) are connected to one another via a discharge resistor (12). (6, 9) or (7, 8) and (12d) designate undesired, parasitic leakaqe inductances of the supply leads or of the snubber capacitors (C1, C2) and of the discharge resistor (12). Without the measures according to the invention, the leakage inductances (6-9) amount to approximately 0.1 $\mu$H in each case, while the leakage inductance (12d) of the discharge resistor (12) is approximately 0.5 $\mu$H.

FIG. 3 shows the arrangement of the components in accordance with FIG. 2 in connection with a link capacitor bank (3), but without the leakage inductances (6-9, 12d). (13-16) designate metallic heat sinks which are arranged on both sides of the GTO thyristors (T1, T2) and dissipate the heat losses thereof. The heat sinks (13-16) can be operated using air, oil or water cooling. The GTO thyristors (T1, T2) and the heat sinks (13-16) are situated together with an insulator (32) in a connecting strainer (33) indicated by dashes, which is acted upon from both sides by equally strong but oppositely directed elastic forces (K1, K2), in order to ensure good thermal conduction between the GTO thyristors (T1, T2) and their heat sinks (13-16).

(23) and (24) are respectively positive and negative current conductors for connection of the capacitor bank (3), which extend essentially parallel to one another and are respectively connected to the anode-side heat sink (14) of the GTO thyristor (T1), which is at a positive potential, and to the cathode-side heat sink (15) of the GTO thyristor (T2), which is at a negative potential. The snubber diodes (D1, D2) are respectively mounted to conduct heat effectively on the cathode-side heat sink (13) of the GTO thyristor (T1) and on the anode-side heat sink (16) of the GTO thyristor (T2), as can be seen better from FIG. 5. The snubber capacitors (C1, C2) are arranged at a slight lateral spacing from the heat sinks (14) and (15), respectively; they each have a capacitor cover (17), which is made of copper or is a good electrical conductor and surrounds the snubber capacitors at least partially. In order to keep leakage inductances low, the discharge resistor (12) is arranged at a slight distance symmetrically with respect to the two capacitor covers (17), and connected to the latter.

FIG. 4 shows the discharge resistor (12) diagrammatically in cross-section. To enable good ventilation, a resistor body designated by (12a) is constructed by means of spaced resistor plates. A copper cover or sheet-metal shielding cover (12b), which contacts the resistor body electrically on the end faces, preferably over the entire end face, is slipped over the resistor body (12a) from above and below, respectively. Connected electrically to the sheet-metal shielding covers (12b) are connecting plates (12c) which lead in the gap between the resistor plates to the end faces of the resistor body (12a), so that the current is led to these end faces both from outside and from inside, cf. the arrows drawn in. The current flows through the resistor body (12a) from the upper end face to its lower end face, and is then removed via the lower sheet-metal shielding cover (12b) and the connecting plate (12c) connected thereto.

FIG. 5 shows in a section the design of the construction of the circuit arrangement in accordance with FIG. 3. (22) designates a disk-shaped insulator between the two snubber capacitors (C1, C2), and (25) designates a disk-shaped insulator between link capacitors (C11-Cn1, Cn1'-C11') connected in series. The thickness of the insulator (25) is ≦4 4 mm/kV, preferably ≧1.5 mm/kV, in the example 3 mm. The link capacitors (C11-Cn1, Cn1'-C11') are connected to the positive or negative current conductor (23, 24), and connected to one another by connecting bars (26-28) extending parallel to one another. The end bar (28) is configured in the shape of a U. The link capacitors (C11-Cn1) or (Cn1'-C11') are arranged in opposite planes in such a way that the connection elements of the capacitors are opposite one another. The central axes of the oppositely arranged capacitors (C11-C11'; C21, C21'; ...) need not necessarily be identical; they can also be arranged slightly offset with respect to one another (not represented).

The snubber capacitor (C1) is surrounded in its upper part by a closely fitting capacitor cover (17) and in its lower part by a capacitor insulating cap (18), which has an opening in the center for an electrical terminal. This terminal is electrically connected to the heat sink (14) via a U-shaped connecting bracket (20) whose U-bow is situated above the GTO thyristor (T1). The capacitor cover (17) is connected via a conductive U-shaped connecting bracket (19) to the diode (D1), and the latter is connected to the heat sink (13) via a valve shielding bracket (21). The valve shielding bracket (21) is curved above the GTO thyristor (T1) and spaced from the connecting bracket (20) by the required insulating spacing. As a result, the space adjacent to the GTO thyristor (T1) is kept largely free of electric fields.

FIG. 6 shows a parallel capacitor circuit of link capacitors (C11-C1m) and (C11'-C1m') of the link capacitor bank (3), link capacitors which are connected in parallel being arranged with respect to the representation in FIG. 5 in a plane perpendicular to the plane of the drawing. (29) and (30) designate capacitor connecting bars extending parallel to one another, and (31) designates an insulator situated therebetween, corresponding to the insulator (25).

FIG. 7 shows a low-inductance arrangement of link capacitors (C11-C16, C21-C26, Cn1-Cn6) connected in parallel and in series of the link capacitor bank (3) in accordance with FIG. 1, which arrangement is of particular interest when the space is restricted in width. The link capacitors (C11-C16, Cn1-Cn6) to be connected in parallel are arranged in each case in 2 rows offset with respect to one another, a (2n)th capacitor (C12, C14, C16; Cn2, Cn4, Cn6) being placed in a 2nd row partially in the gap between the (2n−1)th and the (2n+1)th capacitor (C11, C13, C15; ... Cn1, Cn3, Cn5) in a row 1st n=1, 2, ... being integers.

The link capacitors (C11-C16, ... Cn1-Cn6) to be connected in parallel are electrically connected by finger sheets (F1-Fn) with sheet metal fingers (F12, F14, F16; ... Fn1, Fn3, Fn5), which are offset with respect to one another and reach into the gaps of the respective other capacitor row. Finger sheets (F2-Fn-1) for a series circuit have sheet metal fingers (F21, F23, F25) or (F22, F24, F26) offset with respect to one another on opposite sides. The further capacitor parallel circuits (C21-C26; ... Cn1-Cn6) to be connected in series with a 1st capacitor parallel circuit (C11-C16) are identically constructed and arranged as the 1st. The last finger sheet (Fn) is bent in the shape of a U, cf. the capacitor connecting bar (28) in FIG. 5.

Instead of being rectangular, the lugs of the sheet metal fingers (F12-Fn5) on the respective finger sheet (F1-Fn) can also be rounded. It is important that adequate insulating spacings are ensured.

Plotted in FIG. 8 on the ordinate is the voltage (U) and the current (I) and on the abscissa the time (t) in arbitrary units. ($U_{AK}$) designates the temporal variation of the anode-cathode voltage of a GTO thyristor (T1, T2), and ($I_{AK}$) designates the temporal variation in the anode-cathode current of the same thyristor. After the arrival of a turn-off signal at the gate electrode of the turn-off thyristor at an instant (t1), the thyristor's gate electrode-cathode current has reached 1/10 of its minimum value (not represented), while ($U_{AK}$) and ($I_{AK}$) are still unchanged. The anode-cathode current ($I_{AK}$) reaches a first minimum at an instant (t2). At the same time, the anode-cathode voltage ($U_{AK}$) reaches a first maximum, which is not permitted to exceed a first limit value ($U_{G1}$) set by the design. At an instant (t3), ($U_{AK}$) reaches a 2nd maximum, which is not permitted to exceed a 2nd limit value ($U_{G2}$), likewise set by the design.

The achievement of the measures for reducing the parasitic inductances is that the 2nd maximum, in particular, of ($U_{AK}$) is reduced, cf. the dotted curve section denoted by ($U_K'$). It is possible for the link direct voltage now to be increased by this voltage difference, and for the power of the inverter to be increased in proportion to this difference.

A particularly low-inductance connection of the link capacitor bank (3) is ensured by the arrangement of the plus/minus terminals (23, 24) in the middle of the heat sink connecting strainer (33) instead of the usual end arrangement. The leakage inductance of the snubber capacitors (C1, C2) is reduced principally by means of the capacitor covers (17), and those of the discharge resistor (12) by the two sheet metal shielding covers (12b). The reduction of all 5 parasitic inductances (6-9, 12d) reduces the voltage stress of the GTO thyristors (T1, T2), to the same extent, and permits an increase in the link voltage. However even individual measures, such as with the discharge resistor, for example, can already permit a substantial increase in direct voltage.

In the practical embodiment, a total reduction of approximately 0.45 µH is achieved in the leakage inductances (6-9, 12d), which permits the link voltage to be raised by approximately 300 V from 3.2 kV to 3.5 kV.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A converter comprising:
    a direct voltage circuit; and
    at least one inverter circuit, each inverter circuit further including:
    first and second series connected current switches in each phase, an output for each phase being connected to a cathode of said first switch and to an anode of said second switch; and
    at least one snubber capacitor connected to each of said first and second switches, a first electrical connection of each snubber capacitor being electrically connected to a capacitor cover which partially surrounds the snubber capacitor.

2. Converter according to claim 1, further including:
    a discharge resistor for electrically interconnecting two of said snubber capacitors in each inverter phase; and
    two conductive sheet metal shielding covers located over said discharge resistor for electrical contact with current input and output portions of said discharge resistor.

3. Converter according to claim 1, further including:
    a heat sing connecting strainer for housing said first and second switches, positive and negative terminals of said first and second switches, respectively being located in a central portion of the heat sink connecting strainer; and
    conductive u-shaped capacitor connecting brackets for electrically connecting each snubber capacitor to a metallic heat sink of the first and second switches, respectively, said conductive capacitor connecting brackets being connected to a capacitor terminal formed adjacent a lateral edge of said snubber capacitor and connected to said snubber capacitor.

4. Converter according to claim 2, further including:
    a heat sing connecting strainer for said first and second switches, positive and negative terminals of said first and second switches, respectively being located in a central portion of the heat sink connecting strainer; and
    conductive u-shaped capacitor connecting brackets for electrically connecting each snubber capacitor to a metallic heat six of the first and second switches, respectively, said conductive capacitor connecting brackets being connected to a capacitor terminal formed adjacent a lateral edge of said snubber capacitor and connected to said snubber capacitor.

5. Converter according to claim 1, further including:
    a conductive capacitor connecting bracket for electrically connecting a first terminal of each snubbing capacitor to a snubber diode;
    a metallic heat sink for said first and second switches; and
    a conductive shielding bracket for electrically and thermally connecting said snubber diode to said metallic heat sink and for at least partially electrically shielding at least one of said first and second switches from said snubber capacitor and said snubber diode.

6. Converter according to claim 2, further comprising:
    conductive connecting plates connected to each sheet metal shielding cover for contacting said discharge resistor at different, uniformly spaced locations, each said sheet metal shielding cover further including cooling openings therein.

7. Converter according to claim 1, wherein said direct voltage circuit includes a plurality of capacitors said converter further comprising:
    capacitor connecting bars for electrically connecting said plurality of capacitors, said connecting bars being mutually insulated and at least partially arranged in parallel, terminals of said plurality of capacitors being oriented such that for any two capacitors, one capacitor is directly opposite another or arranged with a lateral offset with respect to the other.

8. Converter according to claim 7, further comprising:
    a finger sheet having a first set of sheet metal fingers offset relative to one another for connecting capacitor terminal elements for said plurality of capacitors of said direct voltage circuit in parallel, said plurality of capacitors being arranged in parallel in two rows offset relative one another such that a (2n)th capacitor is placed in one of said two rows partially in a gap between a (2n−1)th and a (2n+1)th capacitor in the other of said two rows, n being an integer.

9. Converter according to claim 8, further comprising:
    at least one additional parallel circuit of capacitors, said additional parallel circuit being arranged identical to said plurality of capacitors and being connected in series with said plurality of capacitors, and
    at least one additional finger sheet having a second set of sheets metal fingers spaced from one another on opposite sides of said second finger sheet for connection with capacitor terminal elements of said at least one additional parallel circuit.

10. A converter comprising:
    a direct voltage circuit; and
    at least one inverter circuit, each inverter circuit further including:
    first and second series connected switches in each phase, an output for each phase being connected to a cathode of said first switch and to an anode of said second switch;
    first and second snubber capacitors connected to each of said first and second switches, respectively, said first and second snubber capacitors being electrically connected to one another via a discharge resistor; and two conductive sheet metal shielding covers located over said discharge resistor for establishing a current path through the discharge resistor via electrical contact therewith.

11. Converter according to claim 10, further comprising:

conductive connecting plates connected to each sheet metal shielding cover for contacting said discharge resistor at different, uniformly spaced locations, each said sheet metal shielding cover further including cooling openings therein.

12. Converter according to claim 10, wherein said direct voltage circuit includes a plurality of capacitors, said converter further comprising:

capacitor connecting bars for electrically connecting said plurality of capacitors, said connecting bars being mutually insulated and at least partially arranged in parallel, terminals of said plurality of capacitors being oriented such that for any two capacitors, one capacitor is directly opposite another or arranged with a lateral offset with respect to the other.

13. Converter according to claim 12, further comprising:

a finger sheet having a first set of sheet metal fingers offset relative to one another for connecting capacitor terminal elements for said plurality of capacitors of said direct voltage circuit in parallel, said plurality of capacitors being arranged in parallel in two rows offset relative one another such that a $(2n)$th capacitor is placed in one of said two rows partially in a gap between a $(2n-1)$th and a $(2n+1)$th capacitor in the other of said two rows, n being an integer.

* * * * *